US010781607B2

(12) United States Patent
Rogel et al.

(10) Patent No.: US 10,781,607 B2
(45) Date of Patent: Sep. 22, 2020

(54) HANDLE LOAD TRANSFER INSERT FOR PANELS

(71) Applicant: C&D ZODIAC, INC., Huntington Beach, CA (US)

(72) Inventors: Raul Rogel, Cypress, CA (US); Joel Anthony Vizarra, Placentia, CA (US); Ajay Hari, Huntington Beach, CA (US); Francisco Palafox, Long Beach, CA (US)

(73) Assignee: C&D ZODIAC, INC., Huntington Beach, CA (US)

( * ) Notice: Subject to any disclaimer, the term of this patent is extended or adjusted under 35 U.S.C. 154(b) by 0 days.

(21) Appl. No.: 16/203,390

(22) Filed: Nov. 28, 2018

(65) Prior Publication Data

US 2019/0277055 A1  Sep. 12, 2019

Related U.S. Application Data

(60) Provisional application No. 62/641,623, filed on Mar. 12, 2018.

(51) Int. Cl.
| | | |
|---|---|---|
| *E05B 1/00* | (2006.01) |
| *B64C 1/14* | (2006.01) |
| *E06B 3/46* | (2006.01) |
| *F16B 37/04* | (2006.01) |
| *F16B 11/00* | (2006.01) |
| *F16B 5/01* | (2006.01) |

(52) U.S. Cl.
CPC .......... *E05B 1/0015* (2013.01); *B64C 1/1438* (2013.01); *E06B 3/4636* (2013.01);
(Continued)

(58) Field of Classification Search
CPC .......... E05B 1/0015; F16B 9/01; F16B 9/054; F16B 9/053
(Continued)

(56) References Cited

U.S. PATENT DOCUMENTS 3,766,598 A * 10/1973 Roberts .................. A47B 95/02
16/444
5,240,543 A *  8/1993 Fetterhoff ................. F16B 5/01
156/293

(Continued)

FOREIGN PATENT DOCUMENTS

DE   8800333 U1    3/1988
EP   1736618 A2   12/2006
(Continued)

OTHER PUBLICATIONS

Search Report issued in European Application 19162350.3 dated Aug. 5, 2019.

*Primary Examiner* — Emily M Morgan
(74) *Attorney, Agent, or Firm* — Jeffer Mangels Butler & Mitchell LLP; Brennan C. Swain, Esq.

(57) ABSTRACT

A handle attachment assembly that includes first and second insert members, and a handle assembly that includes a cover and a main body portion. The main body portion includes a handle portion and first and second attachment portions extending from the handle portion. The cover is removably connected to the main body portion and the main body portion and the cover cooperate to define a handle interior. The first and second attachment portions include first and second attachment members, respectively. The first attachment portion and the first insert member are secured together by a first fastener, and the second attachment portion and the second insert member are secured together by a second fastener.

12 Claims, 3 Drawing Sheets

(52) U.S. Cl.
CPC ..... *E05Y 2600/46* (2013.01); *E05Y 2600/526* (2013.01); *E05Y 2600/62* (2013.01); *E05Y 2900/502* (2013.01); *F16B 5/01* (2013.01); *F16B 11/006* (2013.01); *F16B 37/048* (2013.01)

(58) Field of Classification Search
USPC .................................................. 411/82, 82.1
See application file for complete search history.

(56) References Cited

U.S. PATENT DOCUMENTS

| | | | |
|---|---|---|---|
| 5,740,587 A * | 4/1998 | Onai .................... | A47B 95/02 16/412 |
| 5,823,729 A * | 10/1998 | Nagayama ............ | B21D 53/24 411/429 |
| 5,938,368 A | 8/1999 | Anderson | |
| 2010/0005631 A1* | 1/2010 | Drach .................. | E05B 1/0015 16/436 |
| 2011/0220267 A1 | 9/2011 | Blancaneaux | |
| 2013/0125345 A1* | 5/2013 | Specht ................. | E05B 1/0015 16/413 |
| 2015/0096678 A1 | 4/2015 | Siboni | |
| 2015/0159936 A1 | 6/2015 | Oh | |

FOREIGN PATENT DOCUMENTS

| | | | | |
|---|---|---|---|---|
| EP | 2100538 A1 * | 9/2009 | ............ | A47B 95/02 |
| GB | 865776 A * | 4/1961 | ........... | E05B 1/0015 |
| IT | VR20090043 A1 | 10/2010 | | |

* cited by examiner

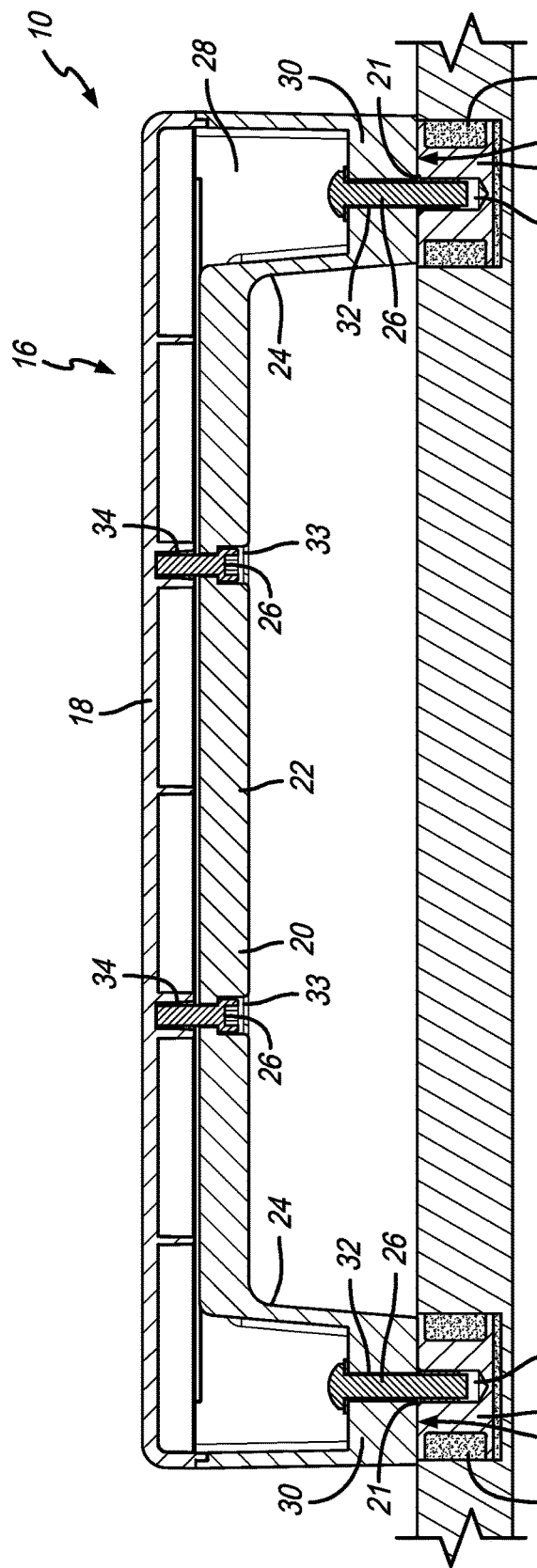
FIG. 3
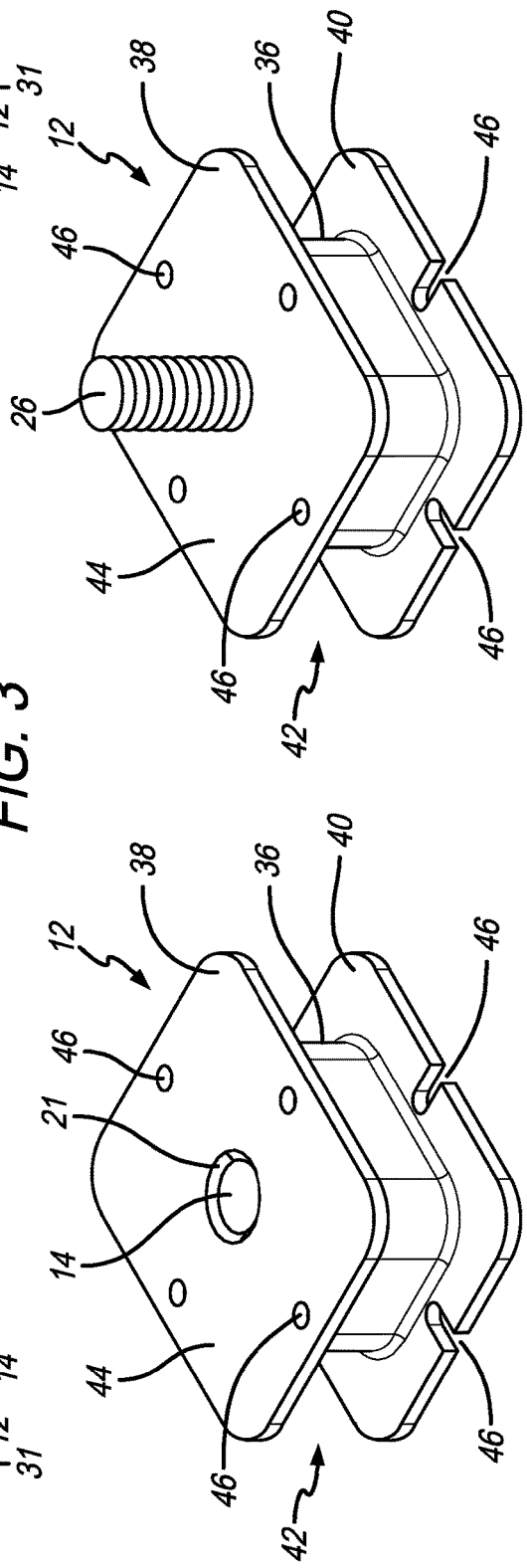
FIG. 4
FIG. 5

HANDLE LOAD TRANSFER INSERT FOR PANELS

CROSS REFERENCE TO RELATED APPLICATIONS

This application claims the benefit of U.S. Provisional Application No. 62/641,623, filed Mar. 12, 2018, the entirety of which is incorporated herein by reference.

FIELD OF THE INVENTION

The present invention relates generally to a handle assembly, and more particularly to a handle assembly that includes an insert for transferring loading forces.

BACKGROUND OF THE INVENTION

Existing handle designs used in the aircraft interior industry typically include doublers to transfer handle loads into the panels or walls of monuments. Typically, the doublers are covered by a decorative laminate which leaves a raised surface that is deemed aesthetically unacceptable by some in the industry. The current state of the art bonded insert is inadequate to transfer the passenger handle load or abuse into the panel. Therefore, it is desirable to provide an interior handle design that is aesthetically acceptable without the use of (or in addition to) doublers on the passenger visible side of the panel. Accordingly, the doublers can be replaced (or supplemented) by an insert that provides integral load transfer to the monument sandwich panel, therefore, eliminating the use of a large reinforcement doubler, and providing an aesthetically acceptable design.

SUMMARY OF THE PREFERRED EMBODIMENTS

In accordance with a first aspect of the present invention there is provided a handle attachment assembly that includes first and second insert members, and a handle assembly that includes a cover and a main body portion. The main body portion includes a handle portion and first and second attachment portions extending from the handle portion. The cover is removably connected to the main body portion and the main body portion and the cover cooperate to define a handle interior. The first and second attachment portions include first and second attachment members, respectively. The first attachment portion and the first insert member are secured together by a first fastener, and the second attachment portion and the second insert member are secured together by a second fastener. In a preferred embodiment, the first insert member includes a first attachment opening, the second insert member includes a second attachment opening, the first attachment portion includes a first through hole defined therein and the second attachment portion includes a second through hole defined therein. Preferably, the first fastener extends from the handle interior, through the first through hole and into the first attachment opening, and the second fastener extends from the handle interior, through the second through hole and into the second attachment opening.

In a preferred embodiment, the first insert member includes an attachment surface having a surface area and the first attachment member includes an outer surface having a surface area. Preferably, the surface area of the attachment surface of the first insert member is approximately the same as or larger than the surface area of the outer surface of the first attachment member. In a preferred embodiment, the second insert member includes an attachment surface having a surface area and the second attachment member includes an outer surface having a surface area. Preferably, the surface area of the attachment surface of the second insert member is approximately the same as or larger than the surface area of the outer surface of the second attachment member. In a preferred embodiment, the surface area of the attachment surface of the first insert member is approximately the same as the surface area of the outer surface of the first attachment member, and the surface area of the attachment surface of the second insert member is approximately the same as the surface area of the outer surface of the second attachment member.

In a preferred embodiment, the first insert member includes a central portion having first and second flanges extending therefrom and the first and second flanges define an adhesive space therebetween. Preferably, the first and/or second flanges include at least one adhesive opening defined therethrough. In a preferred embodiment, the handle portion includes at least a first through opening defined therethrough, the cover includes at least a first receiver opening, and a fastener extends through the through opening and is received in the receiver opening to secure the cover to the main body portion of the handle assembly.

In a preferred embodiment, the first insert member includes the first fastener extending therefrom and the second insert member includes the second fastener extending therefrom. The first attachment portion includes a first through hole defined therein and the second attachment portion includes a second through hole defined therein. The first fastener extends from the first insert member and into the first through hole, and the second fastener extends from the second insert member and into the second through hole.

In accordance with another aspect of the present invention there is provided a handle attachment assembly that includes first and second insert members that include first and second attachment openings, respectively. The first insert member includes a central portion having first and second flanges extending therefrom. The first and second flanges define an adhesive space therebetween, and the first flange includes an adhesive opening defined therethrough. The handle attachment assembly also includes a handle assembly that includes a cover and a main body portion. The main body portion includes a handle portion and first and second attachment portions extending from the handle portion. The cover is removably connected to the main body portion. The main body portion and the cover cooperate to define a handle interior. The first attachment portion includes a first through hole defined therein and the second attachment portion includes a second through hole defined therein. The first fastener extends from the handle interior, through the first through hole and into the first attachment opening. The second fastener extends from the handle interior, through the second through hole and into the second attachment opening. The first insert member includes an attachment surface having a surface area and the first attachment member includes an outer surface having a surface area. The surface area of the attachment surface of the first insert member is approximately the same as or larger than the surface area of the outer surface of the first attachment member. The second insert member includes an attachment surface having a surface area and the second attachment member includes an outer surface having a surface area. The surface area of the attachment surface of the second insert member is approximately the same as or larger than the surface area of the outer surface of the second attachment member.

In accordance with another aspect of the present invention there is provided a panel assembly that includes a panel that includes first and second insert openings defined therein, and a handle attachment assembly that includes first and second insert members and a handle assembly. The first insert member includes a first attachment opening and the second insert member includes a second attachment opening. The handle assembly includes a cover and a main body portion. The main body portion includes a handle portion and first and second attachment portions extending from the handle portion. The cover is removably connected to the main body portion. The main body portion and the cover cooperate to define a handle interior. The first and second attachment portions include first and second attachment members. The first attachment portion includes a first through hole defined therein and the second attachment portion includes a second through hole defined therein. The first fastener extends from the handle interior, through the first through hole and into the first attachment opening, and the second fastener extends from the handle interior, through the second through hole and into the second attachment opening. The first and second insert members are received in the first and second insert openings, respectively.

In accordance with another aspect of the present invention there is provided a method of assembling a panel assembly. The method includes obtaining a panel that includes first and second insert openings defined therein, obtaining a handle attachment assembly, inserting a first insert member into the first insert opening, inserting a second insert member into the second insert opening, inserting a first fastener through a first through hole and into the first attachment opening, inserting a second fastener through a second through hole and into a second attachment opening, and securing the cover to the main body portion of the handle assembly.

In a preferred embodiment, the method includes flowing adhesive through an adhesive opening in a first flange of the first insert member and into an adhesive space, and flowing adhesive through an adhesive opening in a first flange of the second insert member and into an adhesive space. Preferably, the method also includes extending a fastener through a through opening and into a receiver opening to secure the cover to the main body portion of the handle assembly.

The present invention includes a handle attachment assembly with first and second insert members that are used to connect a handle assembly to a monument panel or other wall, door or panel. The insert member generally includes a central portion, first and second flanges and an attachment opening for receiving a fastener (screw, bolt, rivet, etc.) for attaching the handle assembly. In a preferred embodiment, structural potting compound is used to install or adhere the insert member in an opening in the panel. Potting compound is injected through one or more holes (four are shown in the drawings) that are defined through the first flange. One or more slots (four are shown in the drawings) are defined in the second flange that allow potting compound to flow underneath. There can be more or less than four holes and slots. Also, adhesive other than potting compound can be used. In another embodiment, the insert member can be round or another shape other than square. The insert member can be made of metal, plastic, composite or any material that provides sufficient strength.

In a preferred embodiment, the first flange is dimensioned such that it has an outer surface with a surface area that is approximately the same size as the inner or attachment surface of the attachment member of the handle where it is connected. In a preferred embodiment, the handle includes a base or main body portion and a removable cover. The cover is removable so that the fasteners can be inserted into openings in the main body portion and threaded into the central openings in the insert members. Preferably, the assembly includes fasteners that extend through to attach the cover to the main body portion.

BRIEF DESCRIPTION OF THE DRAWINGS

The invention may be more readily understood by referring to the accompanying drawings in which:

FIG. 3 is a cross-sectional side elevation of the handle attachment assembly of FIG. 1;

FIG. 4 is a perspective view of an insert member; and

FIG. 5 is a perspective view of an insert member with a fastener extending therefrom in accordance with a preferred embodiment of the present invention.

Like numerals refer to like parts throughout the several views of the drawings.

DETAILED DESCRIPTION OF THE PREFERRED EMBODIMENTS

Figure 1:
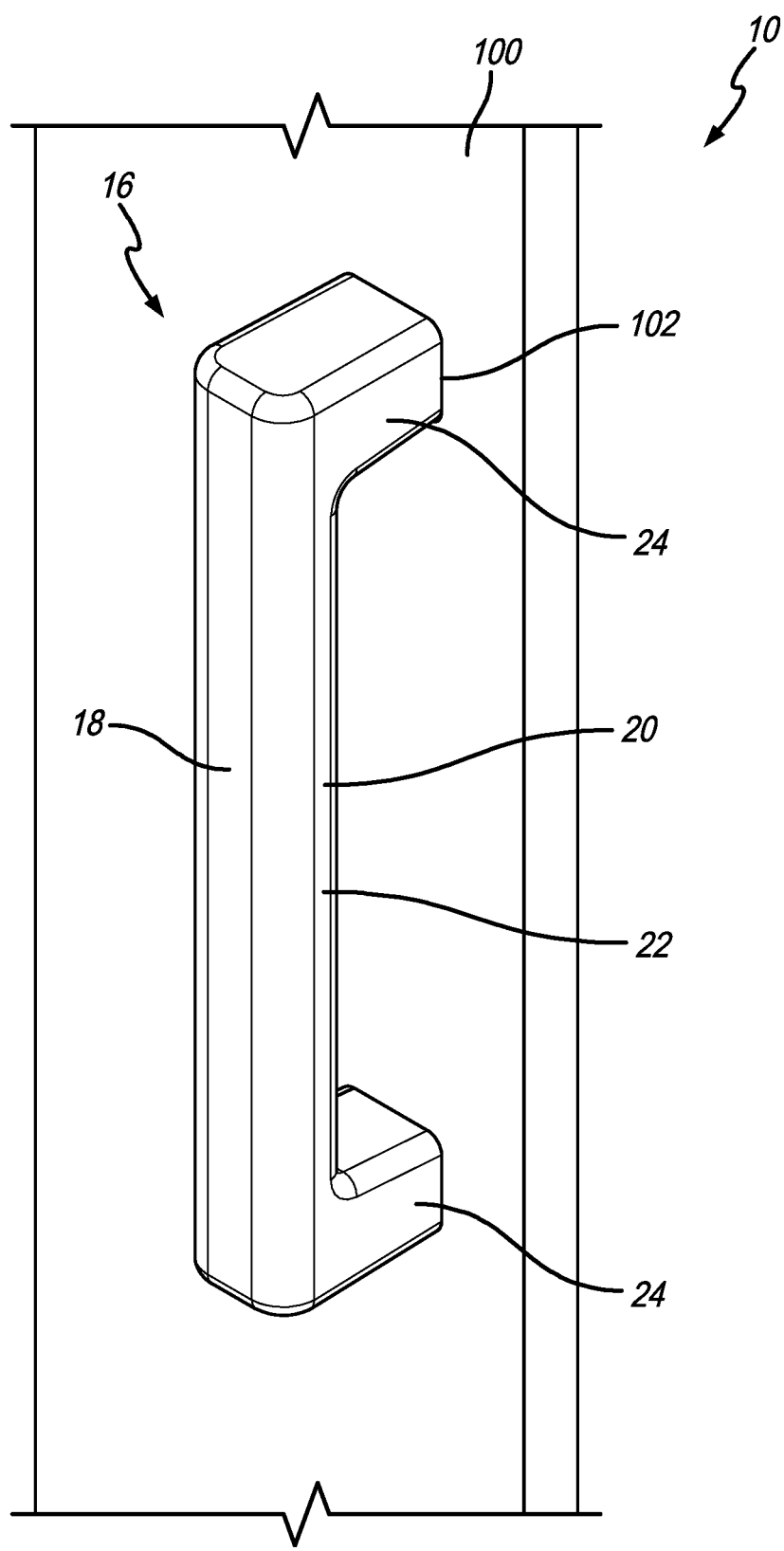
FIG. 1 is a perspective view of a handle attachment assembly in accordance with a preferred embodiment of the present invention.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are references to the same embodiment; and, such references mean at least one of the embodiments.

Reference in this specification to "one embodiment" or "an embodiment" means that a particular feature, structure, or characteristic described in connection with the embodiment is included in at least one embodiment of the-disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks: The use of highlighting has no influence on the scope and meaning of a term; the scope and meaning of a term is the same, in the same context, whether or not it is highlighted.

It will be appreciated that the same thing can be said in more than one way. Consequently, alternative language and synonyms may be used for any one or more of the terms discussed herein. No special significance is to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

It will be appreciated that terms such as "front," "back," "top," "bottom," "side," "short," "long," "up," "down," "aft," "forward," "inboard," "outboard" and "below" used herein are merely for ease of description and refer to the orientation of the components as shown in the figures. It should be understood that any orientation of the components described herein is within the scope of the present invention.

Referring now to the drawings, wherein the showings are for purposes of illustrating the present invention and not for purposes of limiting the same, FIGS. 1-4 show a handle attachment assembly 10 that can be used to secure or attach a handle to a panel 100. In particular, the invention can be used in commercial aircraft where handles are needed to be attached to panels, monuments or the like. However, this is not a limitation on the present invention and the handle attachment assembly 10 can be used elsewhere.

As shown in FIGS. 1-4, in a preferred embodiment, the handle attachment assembly 10 includes first and second insert members 12 that each include a first attachment opening 14 defined therein, and a handle assembly 16 that includes a cover 18 and a main body portion 20. In a preferred embodiment, the attachment openings 14 include a self-locking insert 21. However, this is not a limitation on the present invention and the self-locking insert can be omitted. The main body portion 20 includes a handle portion 22 and first and second attachment portions 24 extending from the handle portion 22. Preferably, the cover 18 is removably connected to the main body portion 20. As shown in FIG. 3, in a preferred embodiment, the cover 18 is connected to the main body portion 20 via fastener, such as threaded fasteners 26 (e.g., screws, bolts, etc.).

As shown in FIG. 3, in a preferred embodiment, the main body portion 20 and the cover 18 cooperate to define a handle interior 28. The first and second attachment portions 24 include first and second attachment members 30 that each include an outer surface 31 and a through hole 32 defined therein. In a preferred embodiment, fasteners 26 extend from the handle interior 28, through the through holes 32 and into the attachment openings 14 in the first and second insert members 12. In another embodiment, the fasteners 26 are permanently attached to and extend from the attachment members 30. In another embodiment, the fasteners 26 extend from the insert members 12, through the through holes 32 and into the handle interior 28.

As shown in FIG. 3, the assembly 10 includes fasteners 26 that extend through openings 33 in the handle portion 22 and into receiver openings 34 defined in boss members in the cover 18 to attach the cover 18 to the main body portion 20.

Figure 2:
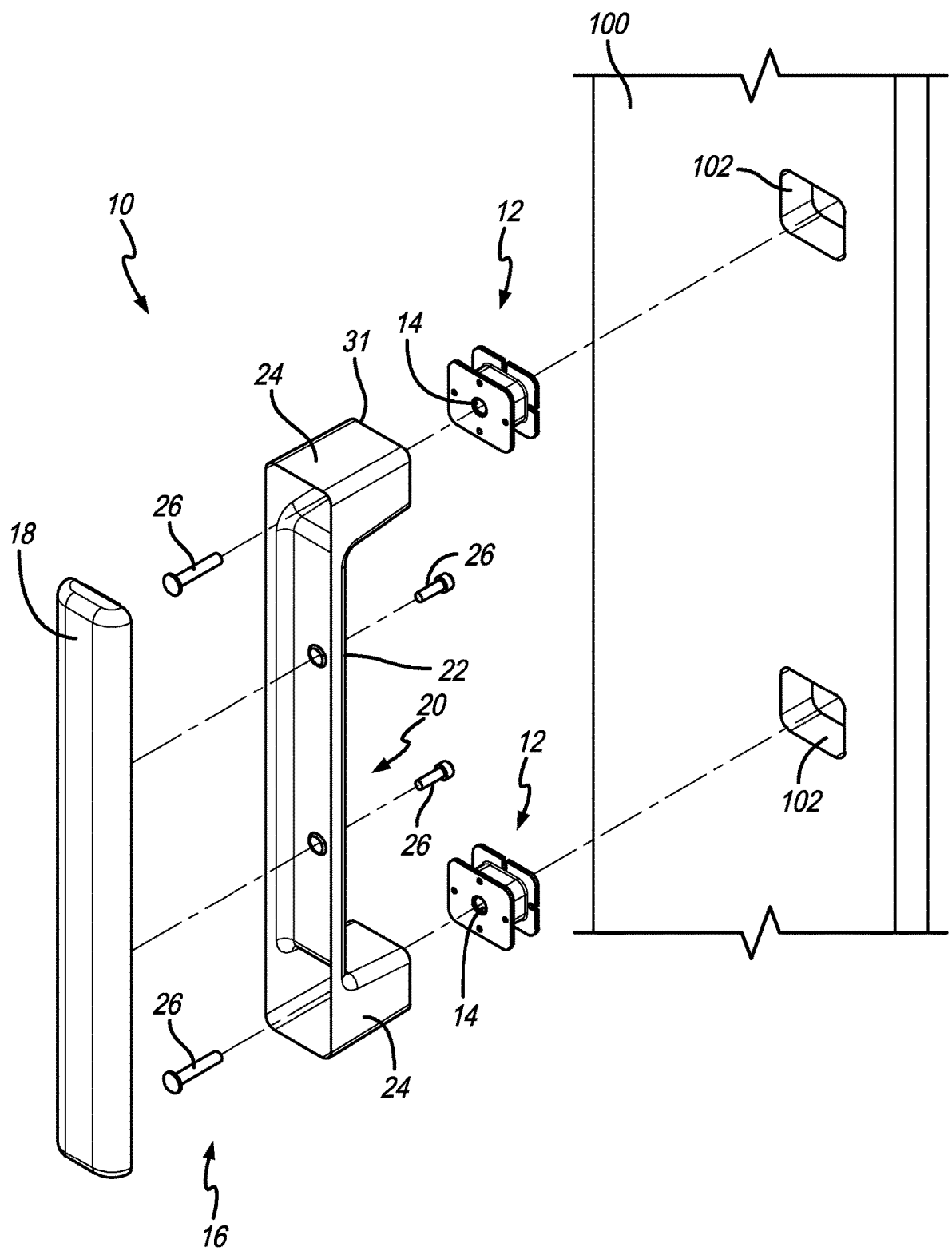
FIG. 2 is an exploded perspective view of the handle attachment assembly of FIG. 1.

As shown in FIG. 4, in a preferred embodiment, each insert member 12 includes a central portion 36 having first and second (or top and bottom) flanges 38 and 40 extending therefrom. An adhesive space 42 is defined between the first and second flanges 38 and 40. The attachment opening 14 is defined in the top surface of the central portion 36 and is preferably flush with the first flange 38 to define an attachment surface 44. Preferably, the first and second flanges 38 and 40 both include adhesive openings 46 defined therein. the adhesive openings 46 can be enclosed openings (see the first flange 38) or slots open to the outer edge of the flange (see the second flange 40). As shown in FIGS. 2 and 3, in a preferred embodiment, the first flange 38 is dimensioned such that it is approximately the same size as the inner surface of the attachment member 30 of the handle portion 22 where it is connected.

In use, structural potting compound or other adhesive 50 is used to install or adhere the insert member 12 in an opening 102 in the panel 100 (see FIG. 2). Potting compound 50 is injected through the adhesive openings 46 (four are shown in the drawings) that are defined through the first flange 38. One or more slots (adhesive openings 46) are defined in the second flange 40 that allow potting compound to flow underneath. There can be more or less than four holes and slots. Also, adhesive other than potting compound can be used. In another embodiment, the insert member 12 can be round or another shape other than square. The insert member 12 can be made of metal, plastic, composite or any material that provides sufficient strength. In a preferred embodiment, the insert member 12 is made out of metal. In this embodiment, the shape and size of insert member 12 along with potting compound, the handle attachment assembly provides sufficient strength.

Once the adhesive 50 has set and dried and the insert members 12 are secured in openings 102, the cover 18 is removed and the fasteners 26 are inserted through the through holes 32 and threaded into the attachment openings 14. The cover 18 is then placed on the handle portion 22 and the fasteners 26 are inserted through openings 33 and are threaded into receiver openings 34 to secure the cover 18 on the handle portion 22.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description of the Preferred Embodiments using the singular or plural number may also include the plural or singular number respectively. The word "or" in reference to a list of two or more items, covers all of the following interpretations of the word: any of the items in the list, all of the items in the list, and any combination of the items in the list.

The above-detailed description of embodiments of the disclosure is not intended to be exhaustive or to limit the teachings to the precise form disclosed above. While specific embodiments of and examples for the disclosure are described above for illustrative purposes, various equivalent modifications are possible within the scope of the disclosure, as those skilled in the relevant art will recognize. Further, any specific numbers noted herein are only examples: alternative implementations may employ differing values, measurements or ranges.

The teachings of the disclosure provided herein can be applied to other systems, not necessarily the system described above. The elements and acts of the various embodiments described above can be combined to provide further embodiments. Any measurements described or used herein are merely exemplary and not a limitation on the present invention. Other measurements can be used. Further, any specific materials noted herein are only examples: alternative implementations may employ differing materials.

Any patents and applications and other references noted above, including any that may be listed in accompanying filing papers, are incorporated herein by reference in their entirety. Aspects of the disclosure can be modified, if necessary, to employ the systems, functions, and concepts of the various references described above to provide yet further embodiments of the disclosure.

These and other changes can be made to the disclosure in light of the above Detailed Description of the Preferred Embodiments. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features or aspects of the disclosure with which that terminology is associated. In general, the terms used in the following claims should not be construed to limit the disclosures to the specific embodiments disclosed in the specification unless the above Detailed Description of the Preferred Embodiments section explicitly defines such terms. Accordingly, the actual scope of the disclosure encompasses not only the disclosed embodiments, but also all equivalent ways of practicing or implementing the disclosure under the claims.

Accordingly, although exemplary embodiments of the invention have been shown and described, it is to be understood that all the terms used herein are descriptive rather than limiting, and that many changes, modifications, and substitutions may be made by one having ordinary skill in the art without departing from the spirit and scope of the invention.

What is claimed is:

1. A handle attachment assembly comprising:
   a first insert member that includes a central portion, a top flange and a bottom flange, wherein the first insert member includes a first attachment opening defined in the central portion, wherein the central portion includes a plurality of side surfaces, wherein an adhesive space is defined between the top flange and the bottom flange and around the side surfaces of the central portion,
   a second insert member that includes a central portion, a top flange and a bottom flange, wherein the first insert member includes a first attachment opening defined in the central portion, wherein the central portion includes a plurality of side surfaces, wherein an adhesive space is defined between the top flange and the bottom flange and around the side surfaces of the central portion, and
   a handle assembly that includes a cover and a main body portion, wherein the main body portion includes a handle portion and first and second attachment portions extending from the handle portion, wherein the cover is removably connected to the main body portion, wherein the main body portion and the cover cooperate to define a handle interior, wherein the handle portion includes an inner surface, wherein first and second through openings are defined through the inner surface, wherein the cover includes first and second threaded receiver openings, and wherein first and second threaded fasteners extend through the first and second through openings and are received in the first and second threaded receiver openings to secure the cover to the main body portion of the handle assembly,
   wherein the first and second attachment portions include first and second attachment members, respectively, wherein the first attachment portion and the first insert member are secured together by the first fastener, wherein the second attachment portion and the second insert member are secured together by the second fastener, wherein the first attachment portion includes a first through hole defined therein, wherein the second attachment portion includes a second through hole defined therein, wherein the first fastener extends from the handle interior, through the first through hole and into the first attachment opening, and wherein the second fastener extends from the handle interior, through the second through hole and into the second attachment opening.

2. The handle attachment assembly of claim 1 wherein the first insert member includes an attachment surface having a surface area, wherein the first attachment member includes an outer surface having a surface area, wherein the outer surface of the first attachment member abuts the attachment surface of the first insert member, wherein the surface area of the attachment surface of the first insert member is larger than the surface area of the outer surface of the first attachment member, wherein the second insert member includes an attachment surface having a surface area, wherein the second attachment member includes an outer surface having a surface area, wherein the outer surface of the second attachment member abuts the attachment surface of the second insert member, and wherein the surface area of the attachment surface of the second insert member is larger than the surface area of the outer surface of the second attachment member.

3. The handle attachment assembly of claim 1 wherein the first insert member includes an attachment surface having a surface area, wherein the first attachment member includes an outer surface having a surface area, wherein the outer surface of the first attachment member abuts the attachment surface of the first insert member, wherein the surface area of the attachment surface of the first insert member is approximately the same as the surface area of the outer surface of the first attachment member, wherein the second insert member includes an attachment surface having a surface area, wherein the second attachment member includes an outer surface having a surface area, wherein the outer surface of the second attachment member abuts the attachment surface of the second insert member, and wherein the surface area of the attachment surface of the second insert member is approximately the same as the surface area of the outer surface of the second attachment member.

4. The handle attachment assembly of claim 1 wherein the top flange includes an adhesive opening defined therethrough.

5. The handle attachment assembly of claim 4 wherein the bottom flange includes an adhesive opening defined therethrough.

6. A panel assembly comprising:
a panel that includes front and back opposing surfaces, wherein separate first and second insert openings are defined through the front surface, and
a handle attachment assembly that includes
first and second insert members, wherein the first insert member includes a central portion, a top flange and a bottom flange, wherein the first insert member includes a first attachment opening defined in the central portion, wherein the central portion includes a plurality of side surfaces, wherein an adhesive space is defined between the top flange and the bottom flange and around the side surfaces of the central portion, wherein the second insert member includes a central portion, a top flange and a bottom flange, wherein the first insert member includes a first attachment opening defined in the central portion, wherein the central portion includes a plurality of side surfaces, wherein an adhesive space is defined between the top flange and the bottom flange and around the side surfaces of the central portion, and
a handle assembly that includes a cover and a main body portion, wherein the main body portion includes a handle portion and first and second attachment portions extending from the handle portion, wherein the cover is removably connected to the main body portion, wherein the main body portion and the cover cooperate to define a handle interior, wherein the handle portion includes an inner surface that faces the front surface of the panel, wherein first and second through openings are defined through the inner surface, wherein the cover includes first and second threaded receiver openings, and wherein first and second threaded fasteners extend through the first and second through openings and are received in the first and second threaded receiver openings to secure the cover to the main body portion of the handle assembly,
wherein the first and second attachment portions include first and second attachment members, wherein the first attachment portion includes a first through hole defined therein, wherein the second attachment portion includes a second through hole defined therein, wherein the first fastener extends from the handle interior, through the first through hole and into the first attachment opening, and wherein the second fastener extends from the handle interior, through the second through hole and into the second attachment opening,
wherein the first and second insert members are received in the first and second insert openings, respectively.

7. The handle attachment assembly of claim 1 wherein the cover includes first and second boss members, wherein the first and second threaded receiver openings are defined in the first and second boss members, respectively.

8. The handle attachment assembly of claim 7 wherein the first and second threaded fasteners each define a threaded fastener axis, wherein the first and second fasteners each define a fastener axis, and wherein the threaded fastener axes extend parallel to the fastener axes.

9. The handle attachment assembly of claim 8 wherein the first and second boss members extend from the cover, through the handle interior and each include a distal end positioned immediately adjacent the handle portion.

10. The panel assembly of claim 6 wherein the cover includes first and second boss members, wherein the first and second threaded receiver openings are defined in the first and second boss members, respectively.

11. The panel assembly of claim 10 wherein the first and second threaded fasteners each define a threaded fastener axis, wherein the first and second fasteners each define a fastener axis, and wherein the threaded fastener axes extend parallel to the fastener axes.

12. The panel assembly of claim 11 wherein the first and second boss members extend from the cover, through the handle interior and each include a distal end positioned immediately adjacent the handle portion.

* * * * *